(12) United States Patent
Ona et al.

(10) Patent No.: US 9,129,722 B2
(45) Date of Patent: Sep. 8, 2015

(54) POWER CABLE

(71) Applicant: J-Power Systems Corporation, Tokyo (JP)

(72) Inventors: Satoshi Ona, Tokyo (JP); Shoji Mashio, Tokyo (JP); Kinya Kumagawa, Tokyo (JP); Itaru Minakawa, Tokyo (JP)

(73) Assignee: J—Power Systems Corporation, Tokyo (JP)

( * ) Notice: Subject to any disclaimer, the term of this patent is extended or adjusted under 35 U.S.C. 154(b) by 0 days.

(21) Appl. No.: 14/661,076

(22) Filed: Mar. 18, 2015

(65) Prior Publication Data

US 2015/0206629 A1     Jul. 23, 2015

Related U.S. Application Data

(63) Continuation of application No. 14/307,557, filed on Jun. 18, 2014.

(30) Foreign Application Priority Data

Jan. 21, 2014   (JP) ................................. 2014-008452

(51) Int. Cl.
   *H01B 9/02*      (2006.01)
   *H01B 9/00*      (2006.01)
   *H01B 9/06*      (2006.01)

(52) U.S. Cl.
   CPC .................. *H01B 9/02* (2013.01); *H01B 9/005* (2013.01); *H01B 9/0683* (2013.01)

(58) Field of Classification Search
   CPC ............. H01B 9/005; H01B 9/02; G01V 3/00

USPC ....................................................... 174/102 R
   See application file for complete search history.

(56) References Cited

U.S. PATENT DOCUMENTS

| 1,896,841 | A | * | 2/1933 | Eby ............................. 174/22 R |
| 2,234,068 | A | * | 3/1941 | Wiseman .................. 174/105 R |
| 2,261,742 | A | * | 11/1941 | Matsumoto ................. 174/21 R |
| 2,283,023 | A | * | 5/1942 | Williams et al. ............ 174/21 R |
| 3,321,568 | A | * | 5/1967 | Venturelli .................... 174/21 R |
| 3,622,682 | A | * | 11/1971 | Buroni ........................ 174/22 R |
| 4,002,820 | A | * | 1/1977 | Paniri et al. .................... 174/115 |
| 5,389,736 | A | * | 2/1995 | Ziemek et al. .................. 174/36 |

(Continued)

FOREIGN PATENT DOCUMENTS

JP           2007-180742           7/2007

OTHER PUBLICATIONS

US Office Action dated May 5, 2015.

*Primary Examiner* — William H Mayo, III
*Assistant Examiner* — Krystal Robinson
(74) *Attorney, Agent, or Firm* — IPUSA, PLLC

(57) ABSTRACT

A power cable includes a steel pipe coupled to a reference potential node, three transmission cables within the steel pipe and respectively including a conductor to transmit three-phase alternating current power, and a return cable within the steel pipe and coupled to the reference potential node. Each of the three transmission cables includes a first insulating layer covering the conductor, a metal layer covering the first insulating layer, and a second insulating layer covering the metal layer. The three transmission cables are twisted around a periphery of the return cable along a longitudinal direction of the return cable, and the metal layer is coupled to the reference potential node.

20 Claims, 9 Drawing Sheets

(56) References Cited

U.S. PATENT DOCUMENTS 6,369,718 B1 * 4/2002 Mathieu ..................... 340/853.7
7,309,835 B2 * 12/2007 Morrison et al. ........... 174/74 R
2012/0188095 A1 * 7/2012 Casals et al. ............. 340/870.03
2012/0214676 A1 8/2012 Matsushita
2012/0214686 A1 * 8/2012 Scaboo et al. .................... 506/9
2013/0269966 A1 * 10/2013 Emme .......................... 174/15.6

* cited by examiner

FIG.3

| | POWER CABLE 100 | COMPARISON EXAMPLE OF POWER CABLE | GROUND-FAULT CAPACITY (0.25sec) |
|---|---|---|---|
| FAULT CURRENT | 60kA 0.25sec | 60kA 0.25sec | — |
| STEEL PIPE 110 | 17.9 | 23.4 | 60 |
| METAL SHEATH 126(R) | 15.0 | 18.4 | 15.6 |
| METAL SHEATH 126(Y) | 8.2 | 11.9 | 15.6 |
| METAL SHEATH 126(B) | 8.2 | 11.9 | 15.6 |
| RETURN CABLE 130 | 15.3 | — | 15.3 |

FIG.7

|  | POWER CABLE 200 | GROUND-FAULT CAPACITY (0.25sec) |
|---|---|---|
| FAULT CURRENT | 60kA 0.25sec | — |
| STEEL PIPE 110 | 8.4 | 60 |
| METAL SHEATH 126(R) | 10.4 | 15.6 |
| METAL SHEATH 126(Y) | 4.4 | 15.6 |
| METAL SHEATH 126(B) | 4.4 | 15.6 |
| RETURN CABLE 130 | 9.0 | 15.3 |
| PIPE 241 | 4.6 | 20 |
| PIPE 242 | 12.6 | 20 |
| PIPE 243 | 11.6 | 20 |

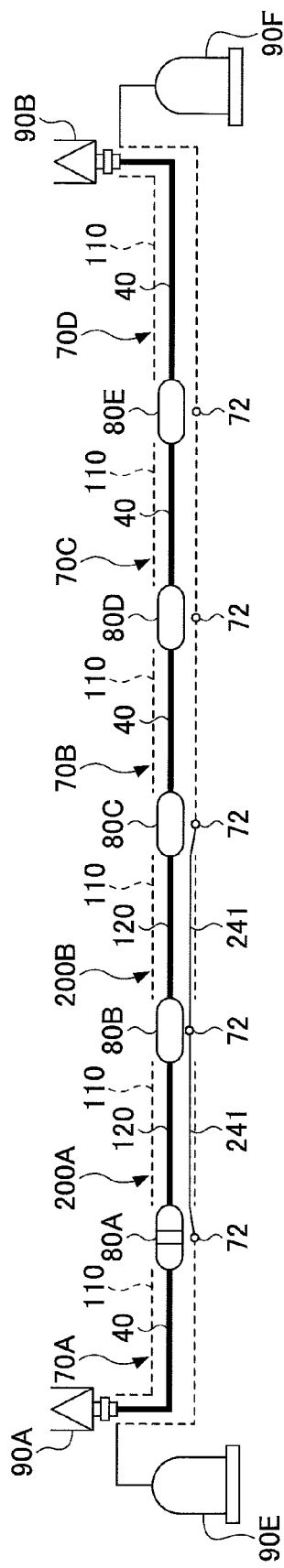
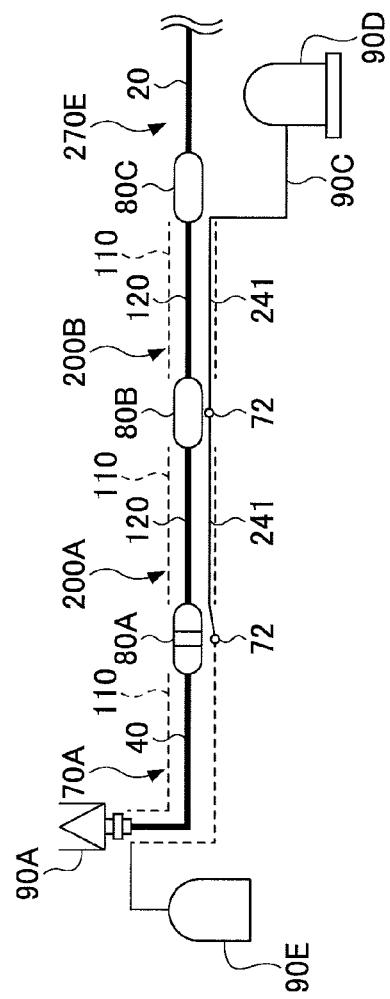
FIG.9A
FIG.9B

POWER CABLE

CROSS-REFERENCE TO RELATED APPLICATIONS

This application is a continuation application of U.S. patent application Ser. No. 14/307,557 filed on Jun. 18, 2014, which is based upon and claims the benefit of priority of Japanese Patent Application No. 2014-008452 filed on Jan. 21, 2014, the entire contents of which are incorporated herein by reference.

BACKGROUND OF THE INVENTION

1. Field of the Invention

The present invention relates to a power cable.

2. Description of the Related Art

An example of a conventional large-capacity power cable may include three (3) transmission cables that are arranged so that center axes thereof in a cross sectional view substantially correspond to three (3) vertexes of an equilateral triangle, where each transmission cable has a semiconductive layer at an outermost layer portion without providing a metal layer on an outer periphery of an insulator. A return path conductor forming a return path for a fault current may be arranged at a center of the equilateral triangle, to be surrounded by the three (3) transmission cables, in order to electrically connect the conductor to the semiconductive layer of the transmission cables. An example of such a conventional large-capacity power cable is proposed in Japanese Laid-Open Patent Publication No. 2007-180742.

In the conventional power cable, the return path conductor forming the return path for the fault current is the only conductor through which the fault current may flow. For this reason, when the fault current is large to a certain extent, a current exceeding a ground-fault capacity of the power cable or the return path conductor may flow and damage the power cable.

SUMMARY OF THE INVENTION

Embodiments of the present invention can provide a power cable that can provide a sufficient path for the fault current.

According to one aspect of the present invention, a power cable may include a first steel pipe coupled to a reference potential node; three first transmission cables, inserted inside the first steel pipe, and respectively including a first conductor to transmit three-phase alternating current power; and a return cable inserted inside the first steel pipe and coupled to the reference potential node, wherein each of the three first transmission cables includes a first insulating layer covering the first conductor, a metal layer covering the first insulating layer, and a second insulating layer covering the metal layer, wherein the three first transmission cables are twisted around a periphery of the return cable along a longitudinal direction of the return cable, and wherein the metal layer is coupled to the reference potential node.

Other objects and further features of the present invention will be apparent from the following detailed description when read in conjunction with the accompanying drawings.

BRIEF DESCRIPTION OF THE DRAWINGS

FIG. 3 is a diagram for explaining a ground-fault capacity of the power cable in the first embodiment;

FIG. 7 is a diagram for explaining the ground-fault capacity of the power cable in the second embodiment;

FIGS. 9A and 9B are diagrams for explaining a state in which existing POF (Pipe type Oil Filled) cables are replaced by the power cables in the second embodiment.

DESCRIPTION OF THE PREFERRED EMBODIMENTS

Figure 1A:
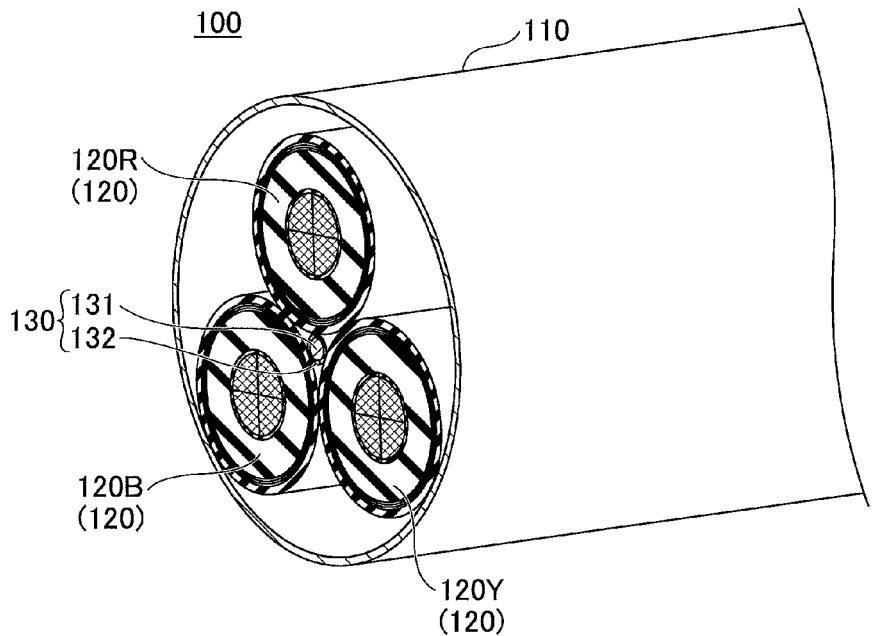
FIGS. 1A and 1B are diagrams for explaining an example of a power cable in a first embodiment.

A description will be given of the power cable in embodiments of the present invention, by referring to the drawings.

First Embodiment

Figure 1B:
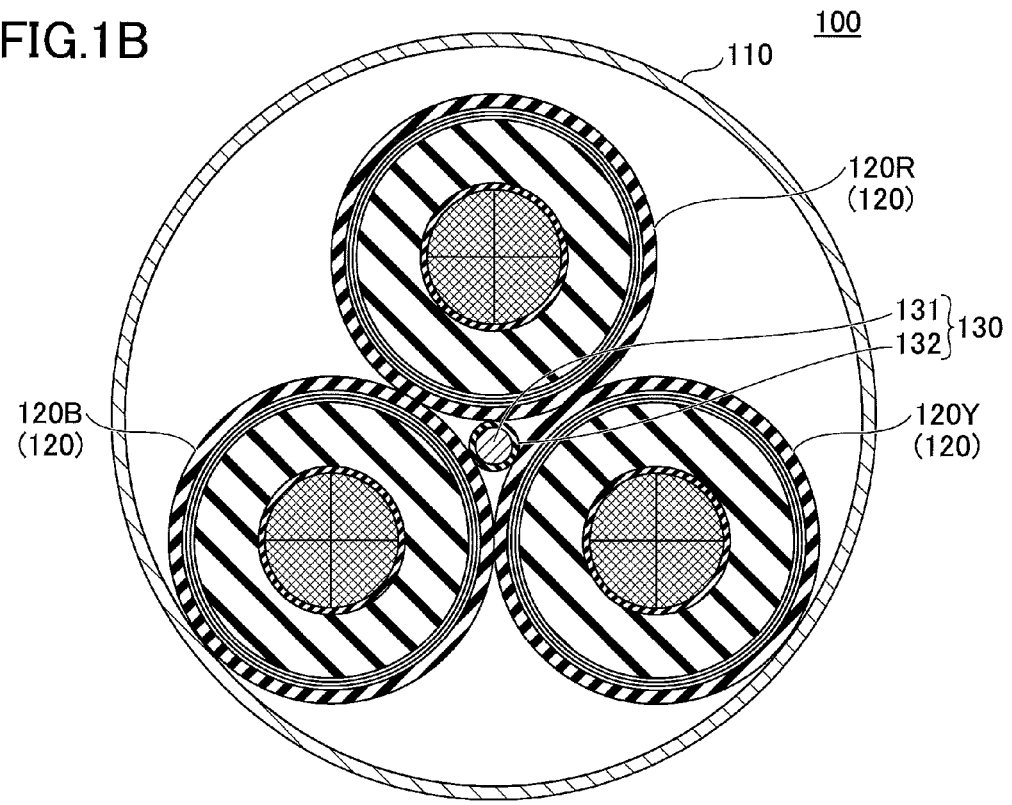

FIGS. 1A and 1B are diagrams for explaining an example of a power cable 100 in a first embodiment. FIG. 1A illustrates a perspective view of power cable 100, and FIG. 1B illustrates a cross sectional view of the power cable 100. The perspective view illustrated in FIG. 1A illustrates a state of the power cable 100 that is cut along a plane perpendicular to a longitudinal direction of the power cable 100.

The power cable 100 includes a steel pipe 110, transmission cables 120R, 120Y and 120B, and a return cable 130.

The steel pipe 110 is be formed by a pipe made of iron, for example. The transmission cables 120R, 120Y and 120B, and the return cable 130 are inserted inside the steel pipe 110. The steel pipe 110 is an example of a first steel pipe, and is connected to a reference potential node. In this first embodiment, the steel pipe 110 is grounded and held at a ground potential. The steel pipe 110 is held at the reference potential, in order to use the steel pipe 110 as a return path for a fault current in a case in which the fault current caused by ground fault or the like flows through the transmission cables 120R, 120Y and 120B.

The steel pipe 110 may be a new, unused steel pipe, or an old, used steel pipe. For example, when replacing an existing power cable by the power cable 100 in this first embodiment, the steel pipe of the existing power cable may be reused as the steel pipe 110 of the power cable 100.

More particularly, the steel pipe of the existing POF (Pipe type Oil Filled) cable, HPFF (High Pressure Fluid Filled) cable, or HPGH (High Pressure Gas Filled) cable, for example, after removing the transmission cables and an insulating oil therefrom and cleaning, may be reused as the steel pipe 110. In this first embodiment, it is assumed for the sake of convenience that the steel pipe of the existing POF cable is reused as the steel pipe 110. An inner diameter of the steel pipe 110 may be in a range of 100 mm to 254 mm, for example, and may be 206 mm, for example. Alternatively, the inner diameter of the steel pipe 110 may be in a range of 6 inches to 10 inches, for example, and may be 8 inches, for example.

In the cross sectional view illustrated in FIG. 1B, the transmission cables 120R, 120Y and 120B are arranged so that center axes thereof substantially correspond to three (3) vertexes of an equilateral triangle, and the return cable 130 is arranged at a center of the equilateral triangle, to be surrounded by the transmission cables 120R, 120Y and 120B. In addition, the transmission cables 120R, 120Y and 120B, and the return cable 130 are inserted into the steel pipe 110 in a state in which the transmission cables 120R, 120Y and 120B are twisted around the return cable 130 along the longitudinal direction of the return cable 130. The transmission cables 120R, 120Y and 120B may be used to transmit power of each phase of three-phase A.C. (Alternating Current) power. The transmission cables 120R, 120Y and 120B are examples of three (3) first transmission cables.

For example, the transmission cables 120R, 120Y and 120B may be categorized as red-phase, yellow-phase and blue-phase cables, respectively, permitting identification of the cables by color. The transmission cables 120R, 120Y and 120B have different colors for identification, but have the same configuration. For this reason, when not distinguishing the transmission cables 120R, 120Y and 120B, these transmission cables 120R, 120Y and 120B may also be referred to as "transmission cables 120" in the following description. The detailed configuration of the transmission cable 120 will be described later in conjunction with FIGS. 2A and 2B.

The return cable 130 includes a conductor 131, and a jacket 132 covering the periphery of the conductor 131. The conductor 131 is made of a metal, and for example, copper may be used as the metal. The jacket 132 is formed by an insulating layer covering the periphery of the conductor 131, and made of a material such as an XLPE (Cross Linked Polyethylene), PVC (Poly-Vinyl Chloride), and the like.

The conductor 131 of the return cable 130 is connected to the reference potential node, similarly to the steel pipe 110. In this first embodiment, the conductor 131 of the return cable 130 is grounded and held at the ground potential. The conductor 131 of the return cable 130 is held at the reference potential, in order to use the return cable 130 as a return path for a fault current in a case in which the fault current caused by ground fault or the like flows through the transmission cables 120.

Next, a description will be given of the detailed configuration of the transmission cable 120, by referring to FIGS. 2A and 2B.

Figure 2A:
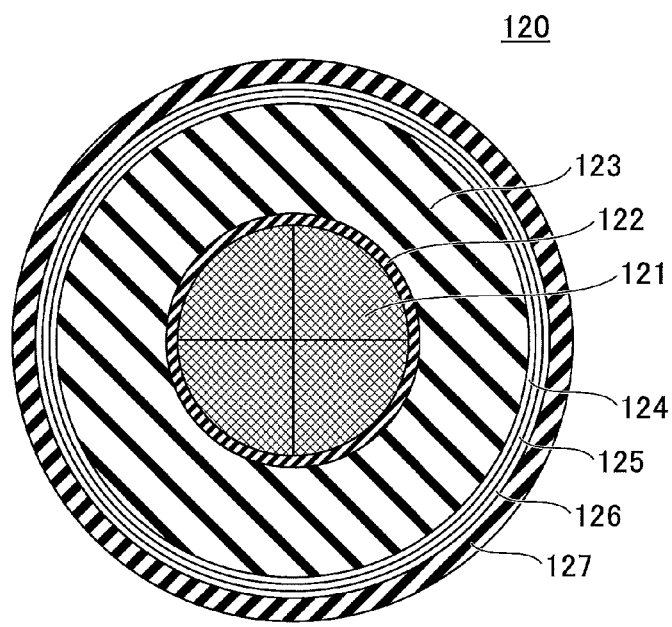
FIGS. 2A and 2B are diagrams for explaining a transmission cable of the power cable in the first embodiment.
Figure 2B:
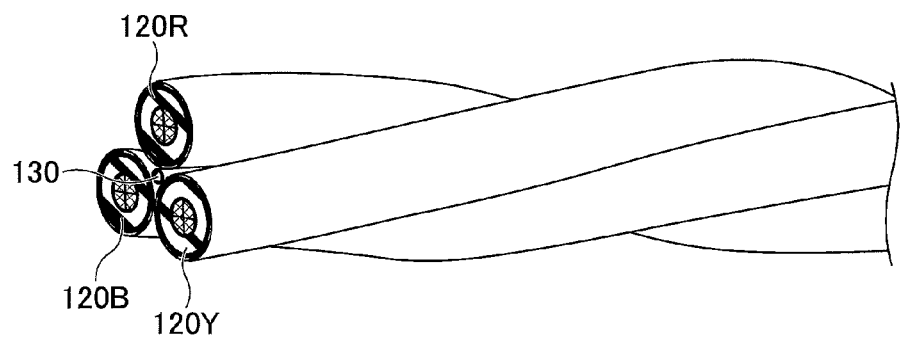

FIGS. 2A and 2B are diagrams for explaining the transmission cable 120 of the power cable 100 in the first embodiment. FIG. 2A illustrates a cross sectional view of the transmission cable 120, and FIG. 2B illustrates a perspective view of a triplex formation.

As illustrated in FIG. 2A, the transmission cable 120 includes a conductor 121, a conductor screen 122, an insulating layer 123, an insulating screen 124, a bedding 125, a metal sheath 126, and a jacket 127. In this example, the conductor screen 122, the insulator layer 123, the insulating screen 124, the bedding 125, the metal sheath 126, and the jacket 127 respectively have a hollow cylindrical shape covering, one by one, the conductor 121 having the solid cylindrical shape (that is, formed by a stranded wire).

The conductor 121 is made of a metal, and for example, copper may be used as the metal. The conductor 121 is an example of a first conductor.

The conductor screen 122 is formed by a semiconductive tape having heat resistance, and a resin layer including carbon powder, and is wound around the periphery of the conductor 121. For example, nylon or polyester may be used as the semiconductive tape having heat resistance, and for example, EEA (Ethylene-Ethylacrylate Copolymer) resin may be used as the resin layer including carbon powder.

The insulating layer 123 is provided to insulate the conductor 121. The insulating layer 123 may be formed by injection molding using XLPE (Crosslinked Poly-Ethylene), for example. In this example, it is assumed that XLPE is used for the insulating layer 123, however, a material other than XLPE may be used for the insulating layer 123 as long as the material is insulative and heat resistant.

The insulating screen 124 is formed by a resin layer including carbon powder, and is wound around the periphery of the insulating layer 123. For example, EEA resin may be used as the resin layer including carbon powder.

The bedding 125 is the so-called bedding tape, and is wound around the insulating screen 124.

The metal sheath 126 is formed by a metal tape that covers the periphery of the bedding 125 along a longitudinal direction of the transmission cable 120. An adhesive layer on this metal tape is bonded to the jacket 127. For example, copper laminated tape may be used as the metal sheath 126. The metal sheath 126 is an example of a metal layer, and is also an example of a metal wrap.

The metal sheath 126 is provided to achieve electrostatic shielding and electromagnetic induction shielding, and to ensure a path for the fault current to flow.

The electrostatic shielding covers the periphery of the conductor 121 by a metal member in order to suppress a high voltage from being induced on the ground side due to the electrostatic capacitance between the conductor 121 and the ground, in a case in which a high voltage is applied to the conductor 121.

The electromagnetic induction shielding covers the periphery of the conductor 121 by a metal member in order to suppress formation of a magnetic field caused by electromagnetic induction that is generated by a closed loop created by the conductor 121 and the ground, in a case in which the fault current is generated.

The metal sheath 126 covers the outer periphery of the conductor 121 via the conductor screen 122, the insulating layer 123, the insulating screen 124, and the bedding 125. Hence, the magnetic field generated due to a current flowing through the conductor 121 is canceled by the current induced by the metal sheath 126.

In addition, the metal sheath 126 is connected to the reference potential node, similarly to the steel pipe 110 and the return cable 130 as described above in conjunction with FIGS. 1A and 1B. In this first embodiment, the metal sheath 126 is grounded and is held at the ground potential, for example. Because the metal sheath 126 is held at the reference potential, the metal sheath 126 can function as a path for a fault current to flow in a case in which the fault current caused by ground fault or the like flows through the transmission cables 120.

The jacket 127 is formed by an insulating layer covering the periphery of the metal sheath 126, for example, polyethylene may be used for the insulating layer. An outer peripheral surface of the jacket 127 can be distinguished amongst the transmission cables 120R, 120Y and 120B by emboss or the like identifying the red-phase, yellow-phase and blue-phase.

The transmission cables 120R, 120Y and 120B having the configuration described above in conjunction with FIGS. 1A and 1B are twisted around the center, return cable 130 along the longitudinal direction of the power cable 100, as illustrated in FIG. 2B. The twisted configuration of the three (3) transmission cables 120R, 120Y and 120B may be referred to as the "triplex formation".

According to the triplex formation of the transmission cables 120R, 120Y and 120B, the transmission cables 120R, 120Y and 120B are twisted around the center, return cable

130, while maintaining rotational symmetry of order three (3), that is, three-fold symmetry, in the cross sectional view illustrated in FIG. 1B. The triplex formation has small expansion and contraction along the longitudinal direction of the transmission cables 120R, 120Y and 120B of the power cable 100, and enables easy fixing within a vault (or manhole) as will be described later. The positional relationship of the transmission cables 120R, 120Y and 120B having the three-fold symmetry in the cross sectional view is not limited to the perfect three-fold symmetry. It is assumed that the transmission cables 120R, 120Y and 120B have the three-fold symmetry in the cross sectional view even when a positional error occurs due to inconsistencies in the twisting and the like of the transmission cables 120R, 120Y and 120B around the return cable 130.

In this first embodiment, in a state in which the transmission cables 120R, 120Y and 120B having the triplex formation are arranged along the outer periphery of the return cable 130, the transmission cables 120R, 120Y and 120B and the return cable 130 are arranged inside the steel pipe 110 as illustrated in FIGS. 1A and 1B.

The power cable 100 described above in this first embodiment transmits three-phase A.C. power by the transmission cables 120R, 120Y and 120B illustrated in FIGS. 1A and 1B. For example, a rated capacity of the power cable 100 is 250 MVA (138 kV, 1045 A). However, this rated capacity is merely an example, and the rated capacity may vary depending on laying conditions, such as the temperature and a burying depth of steel pipe 110.

For example, the power cable 100 has a length of 487.68 m (1600 feet), and a plurality of such power cables 100 are connected in series upon use. In this case, the transmission cables 120R, 120Y and 120B of each power cable 100 are connected to the corresponding transmission cables 120R, 120Y and 120B of another power cable 100 so that the color phases match. Connecting the transmission cables 120R, 120Y and 120B of each power cable 100 to the corresponding, transmission cables 120R, 120Y and 120B of another power cable 100 so that the color phases match means that the conductors 121 of the transmission cables 120R are connected, the conductors 121 of the transmission cables 120Y are connected, and the conductors 121 of the transmission cables 120B are connected, between two adjacent power cables 100 that are connected in series. In this case, with regard to the metal sheaths 126 of the transmission cables 120R, 120Y and 120B of the two adjacent power cables 100 that are connected in series, the metal sheaths 126 of the same color phase may be connected, or the metal sheath 126 may be grounded at each power cable 100.

In addition, the power cable 100 may be used as a new replacement power cable when replacing a part of a plurality of existing power cables that are connected in series. For example, the power cable 100 may be used to replace one of the plurality of existing power cables that are connected in series. In this case, when the existing power cable to be removed has a steel pipe similar to the steel pipe 110 and the transmission cables 120R, 120Y and 120B and the return cable 130 can be inserted into this steel pipe, this steel pipe of the existing power cable to be removed may be used as the steel pipe 110.

In the above described case, the conductors 121 of the transmission cables 120R, 120Y and 120B of the power cable 100 may be connected to the conductors of the corresponding transmission cables of the existing power cables at both ends of the power cable 100 so that the color phases match. Further, the metal sheaths 126 of the transmission cables 120R, 120Y and 120B may be grounded in this case.

Next, consideration will be given of ground-fault capacities of the steel pipe 110 of the power cable 100, the metal sheaths 126 of the transmission cables 120R, 120Y and 120B, and the return cable 130. When an insulator breakdown occurs in the transmission cables 120R, 120Y or 120B of the power cable 100, the metal sheath 126 or the return cable 130 included in the transmission cable 120 in which the insulator breakdown occurs may melt, and a fault current may flow through the steel pipe 110.

In such a case, the fault current flows from the steel pipe 110 of the power cable 100 in which the insulator breakdown occurs to the steel pipe 110, the metal sheaths 126 and the return cables 130 of an adjacent power cable 100 that is connected in series to the power cable 100.

Accordingly, the steel pipe 110, the metal sheath 126, and the return cable 130 of the power cable 100 respectively need to have a ground-fault capacity to a certain extent at least greater than or equal to a fault current dividing ratio. The ground-fault capacities are determined by amounts of current that can flow through the steel pipe 110, the metal sheath 126, and the return cable 130 that may form the path for the fault current to flow.

In the case of a power cable 100 in which the insulator breakdown occurs but the metal sheath 126 or the return cable 130 of the power cable 100 does not melt, the fault current may still flow through the steel pipe 110, the metal sheath 126, and the return cable 130 that may form the path for the fault current to flow.

However, even in such a case, the fault current flows through the steel pipe 110, the metal sheath 126, and the return cable 130 of an adjacent power cable 100. Hence, the ground-fault capacities are evaluated based on amounts of current that can flow through the steel pipe 110, the metal sheath 126, and the return cable 130 of the adjacent power cable 100 that is adjacent to the power cable 100 in which the insulator breakdown occurs but the metal sheath 126 or the return cable 130 of the power cable 100 does not melt.

FIG. 3 is a diagram for explaining the ground-fault capacity of the power cable 100 in the first embodiment. In FIG. 3, a comparison example of the power cable is also considered, in which the return cable 130 is omitted from the power cable 100 in this first embodiment. In the following, the amount of current flowing through the power cable 100 in this first embodiment and the amount of current flowing through the power cable in the comparison example are compared to the respective ground-fault capacities. The current value in FIG. 3 is represented by kA (kilo-Amperes).

For example, the ground-fault capacities of the steel pipe 110, the metal sheath 126, and the return cable 130 that are used are computed under a precondition that the steel pipe 110, the metal sheath 126, and the return cable 130 have predetermined cross sectional areas and that the current flows for 0.25 second.

The ground-fault capacities of the steel pipe 110, the metal sheath 126, and the return cable 130 are 60 kA, 15.6 kA, and 15.3 kA, respectively. The computed ground-fault capacity of the steel pipe 110 is 60 kA or greater, however, it is assumed for the sake of convenience that the computed ground-fault capacity of the steel pipe 110 is 60 kA. In addition, the ground-fault capacity of the metal sheath 126 exists for each of the transmission cables 120R, 120Y and 120B, and the metal sheaths 126 of the transmission cables 120R, 120Y and 120B are represented as "metal sheath 126(R)", "metal sheath 126 (Y)" and "metal sheath 126 (B)" in FIG. 3.

Therefore, for up to a time of 0.25 second, the steel pipe 110, the metal sheath 126, and the return cable 130 can allow currents amounting to 60 kA, 15.6 kA and 15.3 kA to flow, respectively.

In the following description, it is assumed that, in the case in which the steel pipe 110, the metal sheath 126, and the return cable 130 have the ground-fault capacities described above, a current of 60 kA flows through the transmission cables 120R, 120Y and 120B for 0.25 second, and the fault current is generated in the transmission cable 120R. Further, in the following description, the phase in which the fault current is generated may also be referred to as a "fault-phase".

In this first embodiment, the current flowing through the steel pipe 110 of the power cable 100 is 17.9 kA, and the current flowing through the fault-phase metal sheath 126 (R) is 15.0 kA. The current flowing through each of the metal sheaths 126 (Y) and 126 (B) of phases other than the fault-phase is 8.2 kA, and the current flowing through the return cable 130 is 15.3 A.

Accordingly, the amounts of current flowing through the steel pipe 110, the metal sheaths 126 (R), 126 (Y) and 126 (B), and the return cable 130, respectively, are the respective ground-fault capacities or less. Hence, it is confirmed that the power cable 100 in this first embodiment can ensure a sufficient path for the fault current to flow.

On the other hand, in a case in which a current of 60 kA flows through the transmission cables 120R, 120Y and 120B of the power cable in the comparison example including no return cable 130 for 0.25 second, and the fault current is generated in the transmission cable 120R, the current flowing through the steel pipe 110 is 23.4 kA, and the current flowing through the fault-phase metal sheath 126 (R) is 18.4 kA. The current flowing through each of the metal sheaths 126 (Y) and 126 (B) of phases other than the fault-phase is 11.9 kA.

Accordingly, in the case of the power cable in the comparison example, the amount of current flowing through the fault-phase metal sheath 126 (R) exceeds its ground-fault capacity, and it is confirmed that a sufficient path for the fault current to flow cannot be ensured by the power cable in the comparison example.

According to this first embodiment, it is possible to provide the power cable 100 that ensures a sufficient path for the fault current to flow, by including the transmission cables 120R, 120Y and 120B having the triplex formation in which the transmission cables 120R, 120Y and 120B are twisted around the periphery of the return cable 130 along the longitudinal direction of the return cable 130, with the return cable 130 arranged at the center of the transmission cables 120R, 120Y and 120B.

In addition, each of the transmission cables 120R, 120Y and 120B includes the conductor 121, the conductor screen 122, the insulating layer 123, the insulating screen 124, the bedding 125, the metal sheath 126, and the jacket 127 described above.

For example, when replacing the existing power cable by the power cable 100 in this first embodiment, the the transmission cables of the existing power cable may include a shield. Hence, a description will be given of the transmission cable in the comparison example, by referring to FIGS. 4A and 4B.

Figure 4A:
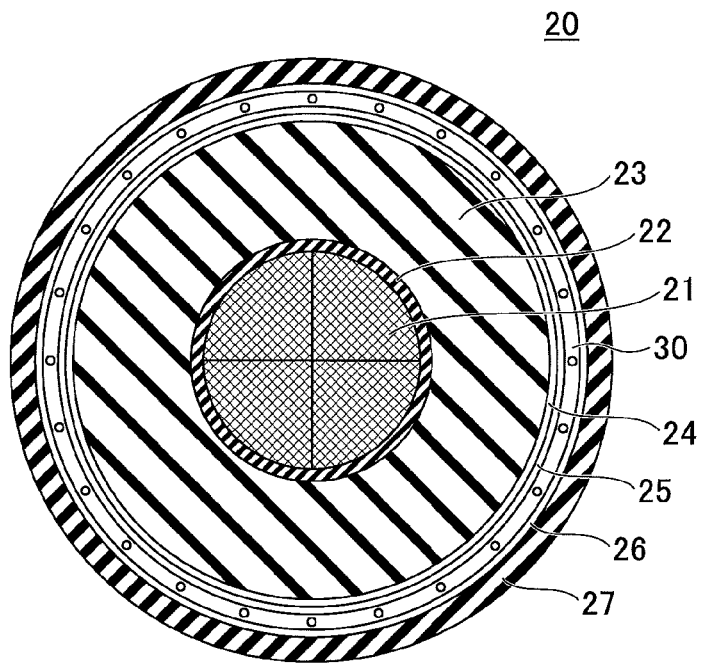
FIGS. 4A and 4B are cross sectional views for explaining a transmission cable and an OF (Oil Filled) cable in a comparison example.
Figure 4B:
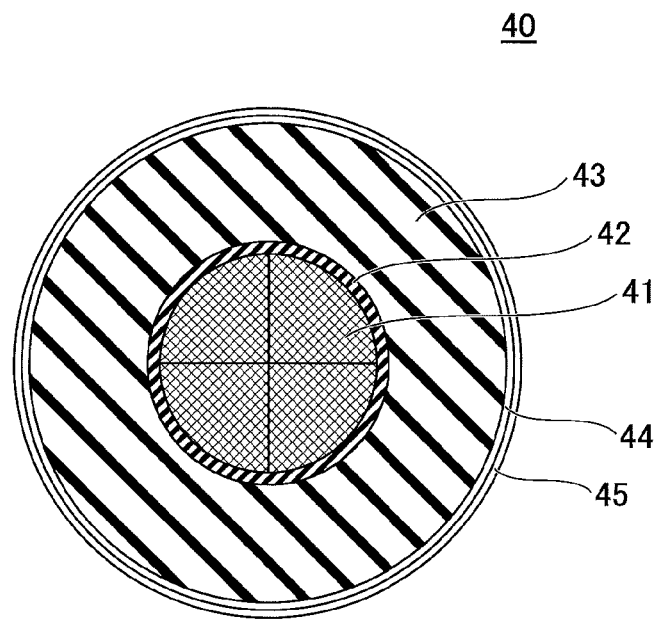

FIGS. 4A and 4B are cross sectional views for explaining a transmission cable 20 and an OF (Oil Filled) cable 40 in the comparison example. FIG. 4A illustrates a cross section of the transmission cable 20, corresponding to the cross section of the transmission cable 120 illustrated in FIG. 2A.

The transmission cable 20 includes a conductor 21, a conductor screen 22, an insulating layer 23, an insulating screen 24, a bedding 25, a shield 30, a metal sheath 26, and a jacket 27. The conductor 21, the conductor screen 22, the insulating layer 23, the insulating screen 24, the bedding 25, the metal sheath 26, and the jacket 27 of the transmission cable 20 in the comparison example correspond to the conductor 121, the conductor screen 122, the insulating layer 123, the insulating screen 124, the bedding 125, the metal sheath 126, and the jacket 127 of the transmission cable 120 in this first embodiment, respectively, and a detailed description thereof will be omitted.

An outer diameter of the jacket 27 of the transmission cable 20 is equal to an outer diameter of the jacket 127 of the transmission cable 120. Because the transmission cable 20 includes the shield 30 between the bedding 25 and the metal sheath 26, the conductor 21 has a size smaller than that of the conductor 121 of the transmission cable 120.

The shield 30 is formed by a metal wire member, and is held at the ground potential (reference potential) together with the metal sheath 26. For example, the metal wire member has a configuration in which a large number of conductors having a diameter on the order of approximately 1 mm to 2 mm are wound around the bedding 25. The shield 30 is provided to achieve electrostatic shielding and electromagnetic induction shielding, and to ensure a path for the fault current to flow.

On the other hand, the OF cable 40 illustrated in FIG. 4B for the POF cable includes a conductor 41, a conductor screen 42, an insulating layer 43, an insulating screen 44, and a bedding 45.

The conductor 41, the conductor screen 42, the insulating layer 43, the insulating screen 44, and the bedding 45 of the OF cable 40 correspond to the conductor 121, the conductor screen 122, the insulating layer 123, the insulating screen 124, and the bedding 125 of the transmission cable 120 in this first embodiment, respectively, and a detailed description thereof will be omitted. In the OF cable 40, the conductor screen 42, the insulating layer 43, the insulating screen 44, and the bedding 45 are made of paper. In the existing POF cable, the OF cable 40 is provided within a steel pipe, and an insulating oil is provided within the steel pipe, so that the steel pipe functions as the metal sheath 126 and the jacket 127 of the transmission cable 120 of this first embodiment.

According to the transmission cable 120 in this first embodiment, the metal sheath 126 provides a sufficient electrostatic shielding property, and the metal sheath 126 and the return cable 130 provide a sufficient electromagnetic induction shielding property. For this reason, in a case in which the existing POF cable has a configuration in which the OF cable 40 is included inside the steel pipe 110, for example, the steel pipe 110 can be reused when making repairs, for example. In this case, when laying the power cable 100, the transmission cables 120R, 120Y and 120B, and the return cable 130 may be inserted inside the steel pipe 110, instead of using a configuration in which a bundle of three (3) transmission cables 20 are included.

The transmission cable 120 in this case has an outer diameter equal to that of the transmission cable 20, however, the transmission cable 120 includes no shield 30. For this reason, the diameter of the conductor 121 in the transmission cable 120 can be made larger than that of the conductor 21 in the transmission cable 20, to thereby improve the transmission capacity.

In addition, in a case in which the existing power cable is the POF cable, it is possible to replace the power cable by the power cable 100 having a high adaptability to the environment without using insulating oil. As a result, it is possible to simultaneously improve the transmission capacity and ensure high adaptability to the environment. High adaptability to the environment means that it is environmentally-friendly or ecological.

Next, a description will be given of a state in which a plurality of power cables 100 are connected via vaults, by referring to FIG. 5.

Figure 5:
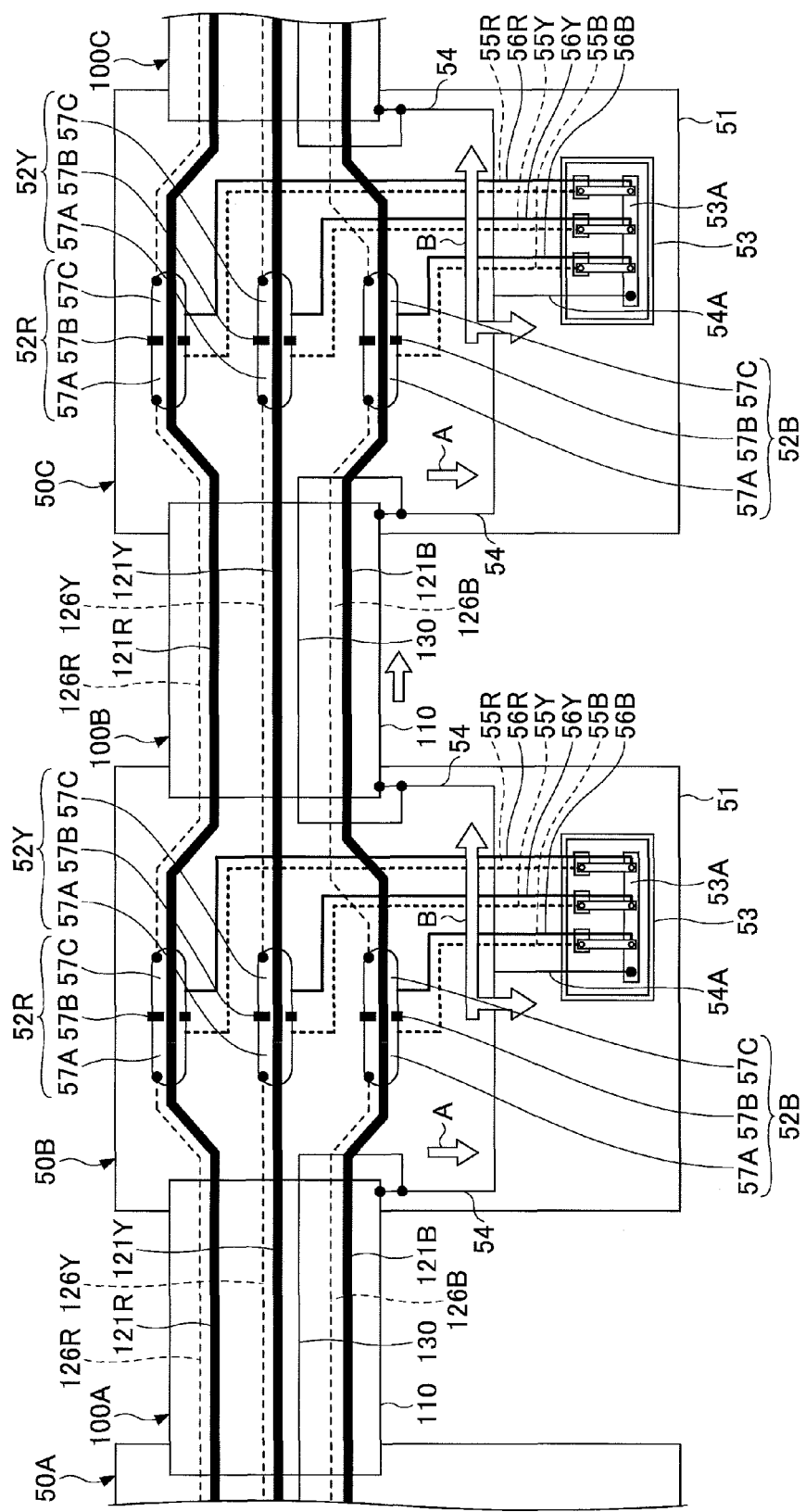
FIG. 5 is a diagram illustrating a state in which a plurality of power cables in the first embodiment are connected via vaults.

FIG. 5 is a diagram illustrating the state in which a plurality of power cables 100A, 100B and 100C in the first embodiment are connected via manholes 50A, 50B and 50C. FIG. 5 illustrates the plurality of power cables 100A, 100B and 100C which are identical to the power cable 100 described above. For this reason, when not distinguishing the power cables 100A, 100B and 100C, these power cables 100A, 100B and 100C may also be referred to as "power cables 100" in the following description.

In FIG. 5, only the steel pipe 110, the conductor 121 and the metal sheath 126 of the transmission cables 120R, 120Y and 120B, and the return cable 130 of the power cable 100 are illustrated. The conductors 121 and the metal sheaths 126 of the transmission cables 120R, 120Y and 120B are respectively represented as conductors 121R, 121Y and 121B and metal sheaths 126R, 126Y and 126B, respectively.

When not distinguishing the conductors 121R, 121Y and 121B and the metal sheaths 126R, 126Y and 126B of the transmission cables 120R, 120Y and 120B, these conductors 121R, 121Y and 121B and these metal sheaths 126R, 126Y and 126B may also be referred to as "conductors 121" and "metal sheaths 126", respectively, in the following description.

The vaults 50A, 50B and 50C have the same configuration, and thus, when not distinguishing the vaults 50A, 50B and 50C, these vaults 50A, 50B and 50C may also be referred to as "vaults 50" in the following description.

The vault 50 includes a housing 51, joints 52R, 52Y and 52B, cables 54, 54A, 55R, 55Y, 55B, 56R, 56Y and 56B, and a link box 53 as a connecting location, for example.

The housing 51 is formed by a concrete, for example, and accommodates connecting parts of the mutually adjacent power cables 100 that are to be connected. The connecting parts include the joints 52R, 52Y and 52B, the link box 53, and the cables 54, 54A, 55R, 55Y, 55B, 56R, 56Y and 56B.

The joint 52R includes a connecting part 57A, an insulating part 57B, and a connecting part 57C. The joints 52Y and 52B have configurations similar to that of the joint 52R. The connecting parts 57A and 57C are formed by a metal connecting member, respectively, and connect the conductors 121R of the mutually adjacent power cables 100A and 100B, but do not connect the metal sheaths 126 of the mutually adjacent power cables 100A and 100B. The metal sheaths 126 of the mutually adjacent power cables 100A and 100B are insulated by the insulating part 58B inside the joint 52R.

The cable 55R is connected to the connecting part 57A of the joint 52R, and the cable 56R is connected to the connecting part 57C of the joint 52R. The cables 55R and 56R are connected via a connecting part 53A of the link box 53. The connecting part 53A of the link box 53 is grounded, and the metal sheath 126 is held at the ground potential via the connecting part 53A of the link box 53.

The joints 52Y and 52B have a configuration similar to that of the joint 52R. Hence, constituent elements of the joints 52Y and 52B are designated by the same reference numerals as the constituent elements of the joint 52R, except that the subscript "R" is replaced by "Y" and "B", respectively.

As described above, the link box 53 includes the connecting part 53A that is held at the ground potential. The connecting part 53A connects the cables 55R, 55Y and 55B to the cables 56R, 56Y and 56B, respectively, and also hold the cables 55R, 55Y and 55B and the cables 56R, 56Y and 56B to the ground potential. Further, the cable 54A that branches from the cable 54 is also connected to the connecting part 53A, and the connecting part 53A holds the steel pipe 110 and the return cable 130 to the ground potential.

The cable 54 connects the steel pipes 110 of the mutually adjacent power cables 100A and 100B. In addition, the return cable 130 is also connected to the cable 54. For this reason, the cable 54 also connects the return cables 130 of the mutually adjacent power cables 100A and 100B.

The cable 54A branches from an intermediate part of the cable 54, and the cable 54A is connected to the connecting part 53A of the link box 53. Because the connecting part 53A of the link box 53 is held at the ground potential, the steel pipe 110 and the return cable 130 are held at the ground potential via the connecting part 53A of the link box 53.

The cable 55R connects the connecting part 57A of the joint 52R and the connecting part 53A of the link box 53. The cable 56R connects the connecting part 57C of the joint 52R and the connecting part 53A of the link box 53. The cables 55R and 56R are mutually connected via the connecting part 53A, and are held at the ground potential.

The cables 55Y and 56Y and the cables 55B and 56B have configurations similar to those of the cables 55R and 56R. Hence, constituent elements of the cables 55Y and 56Y and the cables 55B and 56B are designated by the same reference numerals as the constituent elements of the cables 55R and 56R, except that the subscript "R" is replaced by "Y" and "B", respectively.

The connecting relationship of the mutually adjacent power cables 100B and 100C is similar to that of the mutually adjacent power cables 100A and 100B described above, and the mutually adjacent power cables 100B and 100C are similarly connected via the vault 50.

A case will be considered in which the insulator breakdown occurs in the transmission cable 120R illustrated in FIG. 1B of the power cable 100A including the conductor 121R, when the power cables 100A, 100B and 100C are connected in series as described above.

In this case, the fault current generated in the transmission cable 120R flows to the steel pipe 110 via the metal sheath 126R or the return cable 130 of the power cable 100A, and flows through the cable 54 as indicated by an arrow A. Further, a part of the fault current flows to the steel pipe 110 and the return cable 130 of the power cable 100B via the cable 54 as indicated by an arrow B, and the remaining part of the fault current flows to the connecting part 53A via the cable 54A. The current flowing to the connecting part 53A flows to the metal sheaths 126R, 126Y and 126B of the power cable 100B, via the cables 56R, 56Y and 56B.

Accordingly, the fault current generated by the insulator breakdown in the transmission cable 120R of the power cable 100A flows through the steel pipe 110 of the power cable 100A, and branches to the steel pipe 110, the metal sheaths 126R, 126Y and 126B, and the return cable 130 of the power cable 100B, via the cables 54, 54A, 56R, 56Y and 56B.

As described above in conjunction with FIG. 3, the steel pipe 110, the metal sheaths 126 (126R, 126Y and 126B), and the return cable 130 of the power cable 100 provide a path with a sufficient capacity for the fault current to flow.

For this reason, even when the fault current is generated due to the insulator breakdown in the transmission cable 120, it is possible to suppress the currents flowing through the steel pipe 110, the metal sheaths 126 (126R, 126Y and 126B), and the return cable 130 from exceeding the respective ground-fault capacities thereof, and provide the power cable 100 in which a sufficient path is ensured for the fault current to flow.

Second Embodiment

Figure 6:
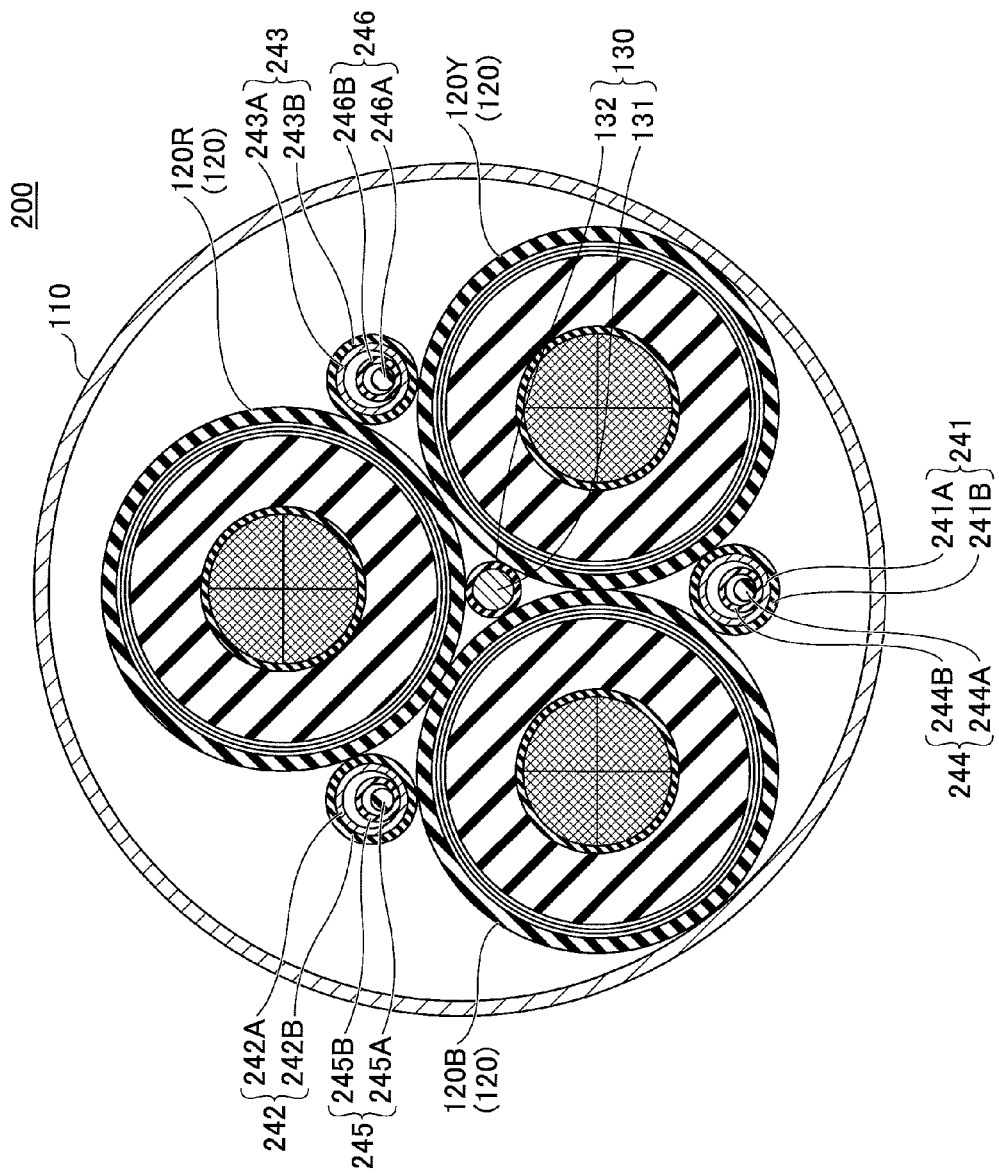
FIG. 6 is a cross sectional view illustrating an example of the power cable in a second embodiment.

FIG. 6 is a cross sectional view illustrating an example of a power cable 200 in a second embodiment. The cross section of the power cable 200 illustrated in FIG. 6 corresponds to the cross section of the power cable 100 illustrated in FIG. 1B.

The power cable 200 illustrated in FIG. 6 includes a steel pipe 110, transmission cables 120R, 120Y and 120B, a return cable 130, and three pipes 241, 242 and 243. In other words, the power cable 200 has a configuration in which the pipes 241, 242 and 243 are additionally provided with respect to the power cable 100 in the first embodiment. Parts other than the pipes 241, 242 and 243 of the power cable 200 are the same as those corresponding parts of the power cable 100 in the first embodiment, and a description thereof will be omitted by designating the same parts by the same reference numerals.

In the cross sectional view of FIG. 6, the pipe 241 is arranged between the transmission cables 120Y and 120B, the pipe 242 is arranged between the transmission cables 120B and 120R, and the pipe 243 is arranged between the transmission cables 120R and 120Y. In addition, the pipes 241, 242 and 243 are twisted along the longitudinal directions of the transmission cables 120R, 120Y and 120B, in a manner similar to the transmission cables 120R, 120Y and 120B.

More particularly, in a state arranged between the transmission cables 120Y and 120B, the pipe 241 is twisted along the longitudinal directions of the transmission cables 120Y and 120B along the outer peripheries of the transmission cables 120Y and 120B.

Similarly, in a state arranged between the transmission cables 120B and 120R, the pipe 242 is twisted along the longitudinal directions of the transmission cables 120B and 120R along the outer peripheries of the transmission cables 120B and 120R. In addition, in a state arranged between the transmission cables 120R and 120Y, the pipe 243 is twisted along the longitudinal directions of the transmission cables 120R and 120Y along the outer peripheries of the transmission cables 120R and 120Y.

The pipes 241, 242 and 243 are arranged in a triplex formation around the return cable 130 located at their center, and are twisted around the transmission cables 120R, 120Y and 120B that are also arranged in the triplex formation and twisted.

The pipes 241, 242 and 243 maintain the three-fold symmetry in the cross sectional view by the triplex formation around the return cable 130 located at their center, and are twisted around the return table 130.

The pipes 241, 242 and 243 are examples of a second conductor, and are connected to the reference potential node. In this second embodiment, the pipes 241, 242 and 243 are grounded, for example, and are held at the ground potential. The pipes 241, 242 and 243 are held at the reference potential in order to provide a path for the fault current to flow by the pipes 241, 242 and 243 in a case in which the fault current is generated in the transmission cable 120 due to ground-fault or the like.

The pipes 241, 242 and 243 have the same configuration. Outer peripheries of pipe parts 241A, 242A and 243A of the pipes 241, 242 and 243 are covered by jackets 241B, 242B and 243B, respectively.

The pipe parts 241A, 242A and 243A are hollow along the longitudinal directions thereof, and are made of aluminum, for example, in this second embodiment. However, the pipe parts 241A, 242A and 243A may be formed by metal pipes other than aluminum pipes.

The jackets 241B, 242B and 243B are insulating layers covering the peripheries of the pipe parts 241A, 242A and 243A, respectively, and are made of polyethylene, for example.

In addition, optic fibers 244, 245 and 246 are inserted into the pipe parts 241A, 242A and 243A, respectively. The optic fibers 244, 245 and 246 may include optic fiber parts 244A, 245A and 246A that are covered by plastic pipes 244B, 245B and 246B, respectively. For example, the optic fiber parts 244A, 245A and 246A may be formed by air-blown fibers, and the plastic pipes 244B, 245B and 246B may be formed by pipes designed for the air-blown fibers.

By arranging the optic fibers 244, 245 and 246 inside the pipe parts 241A, 242A and 243A, respectively, the pipes 241, 242 and 243 can be used as a path for the fault current to flow, and also as an information communication network using the optic fibers 244, 245 and 246.

Because the pipes 241, 242 and 243 are inserted inside the steel pipe 110 together with the transmission cables 120R, 120Y and 120B, and the return cable 130, the pipes 241, 242 and 243 desirably have a diameter that is adjusted so that the pipes 241, 242 and 243 do not protrude on the outer side of the transmission cables 120R, 120Y and 120B along the radial direction relative to the center where the return cable 130 is located.

In addition, when connecting a plurality of power cables 200, the pipes 241, 242 and 243 of the adjacent power cables 200 may be connected, or the plastic pipes 244B, 245B and 246B may be inserted through the pipes 241, 242 and 243 of the adjacent power cables 200, in order to lay the optic fiber parts 244A, 245A and 246A.

Next, consideration will be given of ground-fault capacities of the steel pipe 110 of the power cable 200, the metal sheaths 126 of the transmission cables 120R, 120Y and 120B, the return cable 130, and the pipes 241, 242 and 243. When an insulator breakdown occurs in the transmission cables 120R, 120Y and 120B of the power cable 200, the metal sheath 126, the return cable 130, or the pipes 241, 242 and 243 included in the power cable 200 in which the insulator breakdown occurs may melt, and a fault current may flow through the steel pipe 110.

In such a case, the fault current flows from the steel pipe 110 of the power cable 200 in which the insulator breakdown occurs to the steel pipe 110, the metal sheaths 126, the return cables 130, and the pipes 241, 242 and 243 of an adjacent power cable 200 that is connected in series to the power cable 200.

Accordingly, the steel pipe 110, the metal sheath 126, the return cable 130, and the pipes 241, 242 and 243 of the power cable 200 respectively need to have a ground-fault capacity to a certain extent. The ground-fault capacities are determined by amounts of current that can flow through the steel pipe 110, the metal sheath 126, the return cable 130, and the pipes 241, 242 and 243 that may form the path for the fault current to flow.

In the case of a power cable 200 in which the insulator breakdown occurs but the metal sheath 126, the return cable 130, or the pipes 241, 242 and 243 of the power cable 200 do not melt, the fault current may still flow through the steel pipe 110, the metal sheath 126, the return cable 130, and the pipes 241, 242 and 243 that may form the path for the fault current to flow.

However, even in such a case, the fault current flows through the steel pipe 110, the metal sheath 126, the return cable 130, and the pipes 241, 242 and 243 of an adjacent power cable 200. Hence, the ground-fault capacities are evaluated based on amounts of current that can flow through the steel pipe 110, the metal sheath 126, the return cable 130, and the pipes 241, 242 and 243 of the adjacent power cable 200 that is adjacent to the power cable 200 in which the insulator breakdown occurs but the metal sheath 126, the return cable 130, or the pipes 241, 242 and 243 of the power cable 200 do not melt.

FIG. 7 is a diagram for explaining the ground-fault capacity of the power cable 200 in the second embodiment. In the following, the amounts of current flowing through the power cable 200 in this second embodiment are compared to the respective ground-fault capacities. The current value in FIG. 7 is represented by kA (kilo-Amperes), and FIG. 7 uses the same designations as those used in FIG. 3.

For example, the ground-fault capacities of the steel pipe 110, the metal sheath 126, the return cable 130, and the pipes 241, 242 and 243 that are used are computed under a precondition that the steel pipe 110, the metal sheath 126, the return cable 130, and the pipes 241, 242 and 243 have predetermined cross sectional areas and that the current flows for 0.25 second.

The ground-fault capacities of the steel pipe 110, the metal sheath 126, and the return cable 130 are 60 kA, 15.6 kA, and 15.3 kA, respectively, which are the same as those illustrated in FIG. 3 for the first embodiment. The computed ground-fault capacities of the pipes 241, 242 and 243 are all 20 kA.

Therefore, for up to a time of 0.25 second, the steel pipe 110, the metal sheath 126, the return cable 130, and the pipes 241, 242 and 243 can allow currents amounting to 60 kA, 15.6 kA, 15.3 kA, and 20 kA to flow, respectively.

In the following description, it is assumed that, in the case in which the steel pipe 110, the metal sheath 126, the return cable 130, and the pipes 241, 242 and 243 have the ground-fault capacities described above, a current of 60 kA flows through the transmission cables 120R, 120Y and 120B for 0.25 second, and the fault current is generated in the transmission cable 120R. Further, in the following description, the phase in which the fault current is generated may also be referred to as a "fault-phase".

In this second embodiment, the current flowing through the steel pipe 110 of the power cable 200 is 8.4 kA, and the current flowing through the fault-phase metal sheath 126 (R) is 10.4 kA. The current flowing through each of the metal sheaths 126 (Y) and 126 (B) of phases other than the fault-phase is 4.4 kA, and the current flowing through the return cable 130 is 9.0 A. These amounts of current are reduced compared to the corresponding amounts of current flowing in the power cable 100 described above in the first embodiment. It may be regarded that the amounts of current are reduced in this second embodiment due to the additional provision of the pipes 241, 242 and 243.

The currents flowing through the pipes 241, 242 and 243 are 4.6 kA, 12.6 kA and 11.6 kA, respectively. It may be regarded that a distribution is generated in the amounts of current flowing through the pipes 241, 242 and 243 due to the positional relationship of the pipes 241, 242 and 243 with respect to the fault-phase. The currents flowing through the pipes 241, 242 and 243 are considerably lower than the corresponding ground-fault capacities which are 20 kA.

Accordingly, the amounts of current flowing through the steel pipe 110, the metal sheaths 126 (R), 126 (Y) and 126 (B), the return cable 130, and the pipes 241, 242 and 243, respectively, are the respective ground-fault capacities or less. Hence, it is confirmed that the power cable 200 in this second embodiment can ensure a sufficient path for the fault current to flow.

According to this second embodiment, it is possible to provide the power cable 200 that ensures a sufficient path for the fault current to flow, by including the transmission cables 120R, 120Y and 120B having the triplex formation, and the pipes 241, 242 and 243 having the triplex formation. The transmission cables 120R, 120Y and 120B, and the pipes 241, 242 and 243, are respectively twisted around the periphery of the return cable 130 along the longitudinal direction of the return cable 130 by the triplex formations thereof, with the return cable 130 arranged at the center of the transmission cables 120R, 120Y and 120B and the pipes 241, 242 and 243.

In addition to being used as the path for the fault current to flow, the pipes 241, 242 and 243 can be used as the information communication network through the optic fibers 244, 245 and 246. Of course, the insides of the pipes 241, 242 and 243 may be maintained in the hollow state, without arranging the optic fibers 244, 245 and 246 (including the optic fiber parts 244A, 245A and 246A, and the plastic pipes 244B, 245B and 246B) inside the pipes 241, 242 and 243, respectively.

The optic fibers 244, 245 and 246 may be utilized to form a fiber-optic DTS (Distributed Temperature Sensing) system, such as OPTHERMO (registered trademark). The fiber-optic DTS system can measure the temperature distribution along the optic fibers for several tens of kilometers in real-time, for example, using the optic fibers 244, 245 and 246 themselves as temperature sensors.

In addition, in a case in which a POF cable is connected to one end or both ends of one or a plurality of power cables 200 in order to replace an existing POF cable by the power cable 200, it is possible to utilize the internal spaces within the pipe parts 241A, 242A and 243A as flow passages for the insulating oil, instead of arranging the optic fibers 244, 245 and 246 (including the optic fiber parts 244A, 245A and 246A, and the plastic pipes 244B, 245B and 246B) inside the pipes 241, 242 and 243, respectively. The flow passage for the insulating oil of the adjacent POF cable can be formed by flowing the insulating oil inside the pipe parts 241A, 242A and 243A, as will be described later in conjunction with FIGS. 9A and 9B. Further, the transmission cable 120 can be cooled by flowing a cooling liquid (for example, water) inside the pipes 241, 242 and 243. Accordingly, each of the pipes 241, 242 and 243 may function to provide a path or passage for the composite optic fiber, cooling, and oil.

Next, a description will be given of a state in which a plurality of power cables 200 are connected via a vault, by referring to FIG. 8.

Figure 8:
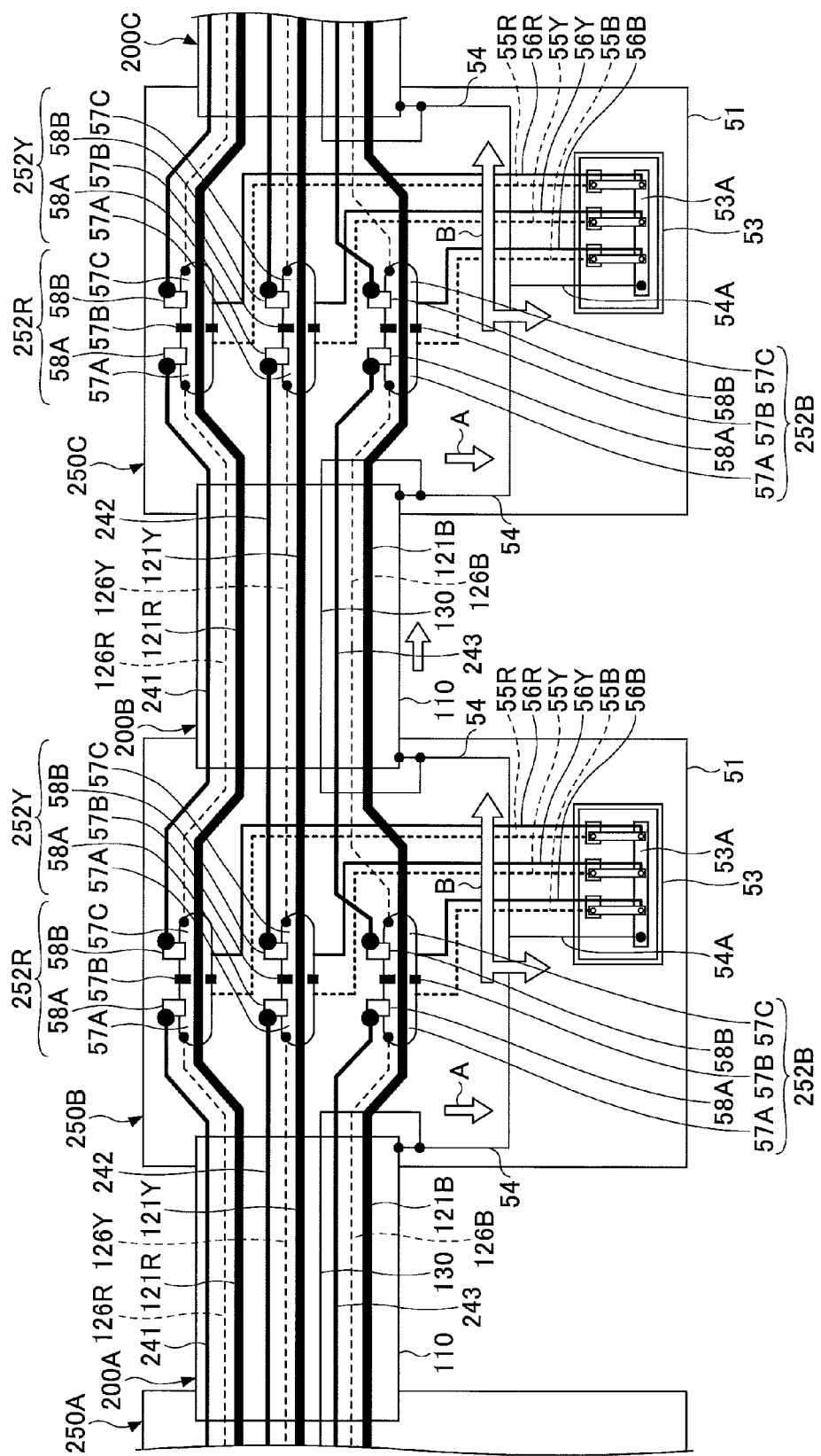
FIG. 8 is a diagram illustrating in which a plurality of power cables in the second embodiment are connected via vaults.

FIG. 8 is a diagram illustrating the state in which a plurality of power cables 200A, 200B and 200C in the second embodiment are connected via vaults 250A, 250B and 250C. FIG. 8 illustrates the plurality of power cables 200A, 200B and 200C which are identical to the power cable 200 described above. For this reason, when not distinguishing the power cables 200A, 200B and 200C, these power cables 200A, 200B and 200C may also be referred to as "power cables 200" in the following description.

In FIG. 8, only the steel pipe 110, the conductor 121 and the metal sheath 126 of the transmission cables 120R, 120Y and 120B, the return cable 130, and the pipes 241, 242 and 243 of the power cable 200 are illustrated. The conductors 121 and the metal sheaths 126 of the transmission cables 120R, 120Y and 120B are respectively represented as conductors 121R, 121Y and 121B and metal sheaths 126R, 126Y and 126B, respectively. The vaults 250A, 250B and 250C have the same configuration, and thus, when not distinguishing the vaults 250A, 250B and 250C, these vaults 250A, 250B and 250C may also be referred to as "vaults 250" in the following description.

The vault 250 has the same configuration as the vault 50 in the first embodiment illustrated in FIG. 5, except that the joints 52R, 52Y and 52B are replaced by joints 252R, 252Y and 252B, respectively. Since other parts of the vault 250 are the same as the corresponding parts of the vault 50, those parts in FIG. 8 that are the same as those corresponding parts in FIG. 5 are designated by the same reference numerals, and a description thereof will be omitted.

The joints 252R, 252Y and 252B have the same configuration, and thus, a description will be given only with respect to the configuration of the joint 252R.

The joint 252R includes a connecting part 57A, an insulating part 57B, a connecting part 57C, and projecting parts 58A and 58B. The connecting parts 57A and 57C, and the insulating part 57B have the same configurations as those of the joint 52R.

The projecting parts 58A and 58B are provided on the connecting parts 57A and 57C, respectively. The projecting parts 58A and 58B project to the outer side of the connecting parts 57A and 57C, respectively, and are made of a metal, similarly to the connecting parts 57A and 57C.

The pipe 241 of the power cable 200A is connected to the connecting part 57A, and the pipe 241 of the power cable 200B is connected to the connecting part 57C. Hence, the pipe 241 is held at the ground potential.

The connections at the joints 252Y and 252B are similar to that at the joint 252R. The joint 252Y connects the pipe 241 of the power cable 200A and the pipe 241 of the power cable 200B. The joint 252B connects the pipe 241 of the power cable 200A and the pipe 241 of the power cable 200B.

The connecting relationship of the mutually adjacent power cables 200B and 200C is similar to that of the mutually adjacent power cables 200A and 200B described above, and the mutually adjacent power cables 200B and 200C are similarly connected via the vault 250.

A case will be considered in which the insulator breakdown occurs in the transmission cable 120R illustrated in FIG. 6B of the power cable 200A including the conductor 121R, when the power cables 200A, 200B and 200C are connected in series as described above.

In this case, the fault current generated in the transmission cable 120R flows to the steel pipe 110 via the metal sheath 126R, the return cable 130, or the pipes 241, 242 and 243 of the power cable 200A, and flows through the cable 54 as indicated by an arrow A. Further, a part of the fault current flows to the steel pipe 110 and the return cable 130 of the power cable 200B via the cable 54 as indicated by an arrow B, and the remaining part of the fault current flows to the connecting part 53A via the cable 54A. The current flowing to the connecting part 53A flows to the metal sheaths 126R, 126Y and 126B and the pipes 241, 242 and 243 of the power cable 200B, via the cables 56R, 56Y and 56B.

Accordingly, the fault current generated by the insulator breakdown in the transmission cable 120R of the power cable 200A flows through the steel pipe 110 of the power cable 200A, and branches to the steel pipe 110, the metal sheaths 126R, 126Y and 126B, the return cable 130, and the pipes 241, 242 and 243 of the power cable 200B, via the cables 54, 54A, 55R, 55Y, 55B, 56R, 56Y and 56B.

As described above in conjunction with FIG. 7, the steel pipe 110, the metal sheaths 126 (126R, 126Y and 126B), the return cable 130, and the pipes 241, 242 and 243 of the power cable 200 provide a path with a sufficient capacity for the fault current to flow. Compared to the power cable 100 in the first embodiment, the capacity of the path for the fault current to flow in the power cable 200 in this second embodiment can be increased by approximately 50%.

For this reason, even when the fault current is generated due to the insulator breakdown in the transmission cable 120, it is possible to suppress the currents flowing through the steel pipe 110, the metal sheaths 126 (126R, 126Y and 126B), the return cable 130, and the pipes 241, 242 and 243 from exceeding the respective ground-fault capacities thereof, and provide the power cable 200 in which a sufficient path is ensured for the fault current to flow.

Although the pipes 241, 242 and 243 are used in this second embodiment, it is possible to use conductors or wires in place of the pipes 241, 242 and 243. In addition, only one or two of the pipes 241, 242 and 243 may be provided.

Next, a description will be given of a case in which an existing POF cable is replaced by the power cable 200, in order to provide a flow passage for the insulating oil, by flowing the insulating oil of the POF cables at both ends of the power cable 200 inside the pipes 241, 242 and 243 of the power cable 200.

FIGS. 9A and 9B are diagrams for explaining a state in which the existing POF cables are replaced by the power cables 200A and 200B in the second embodiment. For the sake of convenience, FIGS. 9A and 9B illustrate only one transmission cable 120 and one pipe 241 and the steel pipe 110 with respect to the power cables 200A and 200B.

In addition, it is assumed in FIGS. 9A and 9B that each of POF cables 70A, 70B, 70C and 70D include three (3) OF cables 40 inserted into the steel pipe 110 thereof, and that the insulating oil is provided inside this steel pipe 110. The OF cable 40 is the OF cable 40 in the comparison example illustrated in FIG. 4B. For the sake of convenience, FIGS. 9A and 9B illustrate only the steel pipe 110 and one OF cable 40 with respect to each of the POF cables 70A, 70B, 70C and 70D. In addition, because the POF cable may function as an oil line, the steel pipe 110 thereof may be treated as an oil line.

In FIG. 9A, the transmission cables 120 of the power cables 200A and 200B are connected between the OF cable 40 of the POF cable 70A and the OF cable 40 of the POF cable 70B, via joints 80A and 80B. The OF cables 40 of the POF cables 70C and 70D are connected on the right side of the OF cable 40 of the POF cable 70B, via joints 80D and 80E. The transmission cables 120 of the power cables 200A and 200B are connected via a joint 80B.

The steel pipe 110 of the POF cable 70A, the pipes 241 of the power cables 200A and 200B, and the steel pipes 110 of the POF cables 70B, 70C and 70D are connected via joints 72. With regard to the pipe 241, the pipe parts 241A of the pipe 241 is connected to the steel pipe 110. Actually, there are three (3) pipes 241, 242 and 243, and thus, there are three (3) pipe parts 241A, 242A and 243A. Hence, the three (3) pipe parts 241A, 242A and 243A are actually merged at the joint 72 and connected to the steel pipe 110. A part of the joint 80A may be formed by one joint 72, and a part of the joint 80C may be formed by another joint 72.

In addition, a terminating part 90A is connected on the left side of the POF cable 70A, and a terminating part 90B is connected on the right side of the POF cable 70D. An oil supply device 90E is connected to the steel pipe 110 of the POF cable 70A, and an oil supply device 90F is connected to the steel pipe 110 of the POF cable 70D.

The joint 80B is a connecting part similar to the vaults 250A through 250C illustrated in FIG. 8. The terminating parts 90A and 90B are connected to a supply source or a supply destination of the power. The terminating parts 90A and 90B are also connected to the oil supply device, in order to manage and adjust the pressure of the insulating oil and the like inside the POF cables 70A through 70D.

When laying the power cables 200A and 200B, the two (2) POF cables that existed between the POF cables 70A and 70B before the replacement are replaced by the power cables 200A and 200B as illustrated in FIG. 9A.

In this case, the replacement by the power cables 200A and 200B, and the provision of the flow passage for the insulating oil between the POF cables 70A and 70B can be achieved simultaneously, by connecting the pipes 241 of the power cables 200A and 200B to the steel pipes 110 of the POF cables 70A and 70B.

Further, in FIG. 9B, the POF cable 70A, the joint 80A, the power cable 200A, the joint 80B, the power cable 200B, the joint 80C, and a power cable 270E are connected to the terminating part 90A. The power cable 270E is a dry type power cable that does not use insulating oil. The power cable 270E is an example of a line or path that is set up at a location where no steel pipe 110 is provided, or at a location where the line or path is not provided inside the steel pipe 110.

An oil line 90C branches from the joint 80C, and connects to an existing oil supply device 90D, for example.

FIG. 8B illustrates a case in which the connection of the plurality of POF cables, the oil supply device 90D, and the power cable 270E that are connected on the right side of the POF cable 70A in a power transmission system before the replacement is modified, by replacing the POF cables other than the POF cable 70A by the power cables 200A and 200B, and reconnecting the modified power transmission system to the existing oil supply device 90D.

In the power transmission system illustrated in FIG. 9B, the power is transmitted between the terminating part 90A and the power cable 270E. In addition, the oil supply device 90D manages and adjusts the pressure and the like of the insulating oil in the steel pipe 110 of the POF cable 70A, via the pipes 241 of the power cables 200A and 200B and the oil line 90C.

According to the power cable 200 in this second embodiment, the pipes 241, 242 and 243 can be utilized as the flow path for the insulating oil, and can be used to replace a part of the existing POF cable.

According to the embodiments described above, the power cable can provide a sufficient path for the fault current.

Further, the present invention is not limited to these embodiments, but various variations and modifications may be made without departing from the scope of the present invention.

What is claimed is:

1. A power cable comprising:
   a first steel pipe coupled to a reference potential node;
   three first transmission cables, inserted inside the first steel pipe, and respectively including a first conductor to transmit three-phase alternating current power; and
   a return cable inserted inside the first steel pipe and coupled to the reference potential node,
   wherein each of the three first transmission cables includes a first insulating layer covering the first conductor, a metal layer covering the first insulating layer, and a second insulating layer covering the metal layer, without a shield wire,
   wherein the three first transmission cables are twisted around a periphery of the return cable along a longitudinal direction of the return cable, and
   wherein the metal layer is coupled to the reference potential node.

2. The power cable as claimed in claim 1, wherein the three first transmission cables, in a cross sectional view of the power cable, have a positional relationship maintaining a three-fold symmetry with respect to the return cable that is located at a center of the three first transmission cables in the cross sectional view.

3. The power cable as claimed in claim 1, wherein the metal layer includes a metal wrap that wraps the first insulating layer.

4. The power cable as claimed in claim 1, further comprising:
   a second conductor, coupled to the reference potential node, and twisted around the periphery of the return cable along the longitudinal direction of the return cable, together with the three first transmission cables.

5. The power cable as claimed in claim 1, further comprising:
   three second conductors twisted around the periphery of the return cable along the longitudinal direction of the return cable, together with the three first transmission cables.

6. The power cable as claimed in claim 5, wherein the three second conductors, in a cross sectional view of the power cable, have a positional relationship maintaining a three-fold symmetry with respect to the return cable that is located at a center of the three second conductors in the cross sectional view.

7. The power cable as claimed in claim 5, wherein each of the three second conductors includes a metal pipe.

8. A power transmission system comprising:
   the power cable as claimed in claim 7,
   wherein the power cable is coupled to a pipe type oil filled cable that includes a second steel pipe, a second transmission cable arranged inside the second steel pipe and coupled to one of the three first transmission cables, and an insulating oil covering the second transmission cable inside the second steel pipe, and
   wherein the metal pipe supplies the insulating oil of the pipe type oil filled cable via the second steel pipe, or receives the insulating oil of the pipe type oil filled cable via the second steel pipe.

9. The power cable as claimed in claim 7, further comprising:
   an optic fiber arranged inside the metal pipe.

10. A power cable comprising:
    a first steel pipe coupled to a reference potential node;
    three first transmission cables, inserted inside the first steel pipe, and respectively including a first conductor to transmit three-phase alternating current power; and
    a return cable inserted inside the first steel pipe and coupled to the reference potential node,
    wherein each of the three first transmission cables includes a first insulating layer covering the first conductor, a metal layer covering the first insulating layer, and a second insulating layer covering the metal layer,
    wherein the three first transmission cables are twisted around a periphery of the return cable along a longitudinal direction of the return cable,
    wherein the metal layer is coupled to the reference potential node, and
    wherein the three first transmission cables include no shield wire between the first insulating layer and the second insulating layer.

11. The power cable as claimed in claim 10, wherein the three first transmission cables, in a cross sectional view of the power cable, have a positional relationship maintaining a three-fold symmetry with respect to the return cable that is located at a center of the three first transmission cables in the cross sectional view.

12. The power cable as claimed in claim 10, wherein the metal layer includes a metal wrap that wraps the first insulating layer.

13. The power cable as claimed in claim 10, further comprising:
a second conductor, coupled to the reference potential node, and twisted around the periphery of the return cable along the longitudinal direction of the return cable, together with the three first transmission cables.

14. The power cable as claimed in claim 10, further comprising:
three second conductors twisted around the periphery of the return cable along the longitudinal direction of the return cable, together with the three first transmission cables.

15. The power cable as claimed in claim 14, wherein the three second conductors, in a cross sectional view of the power cable, have a positional relationship maintaining a three-fold symmetry with respect to the return cable that is located at a center of the three second conductors in the cross sectional view.

16. The power cable as claimed in claim 14, wherein each of the three second conductors includes a metal pipe.

17. The power cable as claimed in claim 16, further comprising:
an optic fiber arranged inside the metal pipe.

18. A power transmission system comprising:
the power cable as claimed in claim 16,
wherein the power cable is coupled to a pipe type oil filled cable that includes a second steel pipe, a second transmission cable arranged inside the second steel pipe and coupled to one of the three first transmission cables, and an insulating oil covering the second transmission cable inside the second steel pipe, and
wherein the metal pipe supplies the insulating oil of the pipe type oil filled cable via the second steel pipe, or receives the insulating oil of the pipe type oil filled cable via the second steel pipe.

19. A power cable comprising:
a first steel pipe coupled to a reference potential node;
three first transmission cables, inserted inside the first steel pipe, and respectively including a first conductor to transmit three-phase alternating current power; and
a return cable inserted inside the first steel pipe and coupled to the reference potential node,
wherein each of the three first transmission cables includes a first insulating layer covering the first conductor, a metal layer covering the first insulating layer, and a second insulating layer covering the metal layer,
wherein the three first transmission cables are twisted around a periphery of the return cable along a longitudinal direction of the return cable, and
wherein the metal layer is coupled to the reference potential node.

20. The power cable as claimed in claim 19, wherein the metal layer is formed by a sheathed metal having a hollow cylindrical shape.

* * * * *